United States Patent
Lee et al.

(10) Patent No.: US 6,324,464 B1
(45) Date of Patent: Nov. 27, 2001

(54) INTELLIGENT SYSTEM FOR REGULATING THE SPEED OF AN ELECTRIC MOTORCYCLE

(75) Inventors: Der-Tsai Lee, Tapei (TW); Chi-Haur Wu, Skokie, IL (US)

(73) Assignee: Academia Sinica, Taipei (TW)

( * ) Notice: Subject to any disclaimer, the term of this patent is extended or adjusted under 35 U.S.C. 154(b) by 0 days.

(21) Appl. No.: 09/475,395

(22) Filed: Dec. 30, 1999

(51) Int. Cl.[7] .................................................. B60R 16/04
(52) U.S. Cl. ..................... 701/93; 180/65.1; 180/65.6; 180/65.7
(58) Field of Search .................. 701/93; 11/22; 180/65.1, 65.6, 65.7, 65.8, 68.5

(56) References Cited

U.S. PATENT DOCUMENTS

| | | | |
|---|---|---|---|
| 4,740,905 | * 4/1988 | Murakami et al. | 702/96 |
| 5,501,292 | * 3/1996 | Kawashima et al. | 180/220 |
| 5,771,475 | * 6/1998 | Tabata et al. | 701/22 |
| 5,828,192 | * 10/1998 | Murakami et al. | 318/139 |
| 5,853,058 | * 12/1998 | Endo et al. | 180/65.1 |
| 5,908,453 | * 6/1999 | Tabata et al. | 701/22 |
| 5,963,140 | * 10/1999 | Kawaguchi | 340/815.58 |

OTHER PUBLICATIONS

Chi–haur Wu, Analysis and Implementation of a Neuromuscular–Like Control for Robotic Compliance, IEEE Transactions on Control System, pp. 586–597, vol. 5, No. 6, Nov. 1997.

Jet P. H. Shu et al., The Development of the Electric Propulsion System for the ZES2000 in Taiwan, Mechanical Industry Research Laboratories, pp. 1–10.

A Zero Emission Motorcycle for the Year 2000, ITRI Today, No. 3, Winter 1995, pp. 1–2.

* cited by examiner

Primary Examiner—William A. Cuchlinski, Jr.
Assistant Examiner—Marthe Y. Marc-Coleman
(74) Attorney, Agent, or Firm—Fish & Richardson P.C.

(57) ABSTRACT

A system for regulating the speed of a motorcycle, of the type powered by an electric motor and a battery, includes a command module that determines a desired speed of the motor, a speed sensor which determines an actual speed of the motor, and a controller which controls the electric motor based on the desired speed and the actual speed.

31 Claims, 7 Drawing Sheets

INTELLIGENT SYSTEM FOR REGULATING THE SPEED OF AN ELECTRIC MOTORCYCLE

BACKGROUND OF THE INVENTION

The invention relates to regulating the speed of an electric motorcycle.

Electric motorcycles are generally driven by an electric motor powered by a battery. The battery requires periodic charging to replenish its energy reserves when its stored electric energy is depleted. The time between successive battery charging sessions is referred to as a charging cycle. The efficiency of an electric motorcycle is generally determined by the distance it travels in one charging cycle.

The energy efficiency of an electric motorcycle depends on the weight, speed, and acceleration of the motorcycle. High-speed travel generally consumes more energy per unit of distance traveled because of increased frictional losses. Rapid acceleration and deceleration also reduce the energy efficiency. Efforts to improve efficiency include making lighter electric motorcycles, designing light high-capacity batteries, and reducing the vehicle drag. However, many of these approaches for improving efficiency significantly increase the cost of the motorcycle.

Many electric motorcycles include a rotatable mechanism (e.g., lever) mounted on the end of the handlebar of the motorcycle that the rider rotates to change the motorcycle's speed. The more the mechanism is rotated the greater the speed. The motorcycle's response to rotation of the mechanism varies depending on a number of factors, including the slope of the motorcycle's path and the weight of the rider.

SUMMARY OF THE INVENTION

The invention features a system for regulating the speed of a motorcycle, of the type powered by an electric motor and a battery. In one general aspect of the invention, the system includes a command module that determines a desired speed of the motor and a controller which controls the electric motor based on both the desired speed and an actual speed of the motor, determined, for example, by a speed sensor.

In essence the system provides a closed-loop controller that, contrary to conventional open-loop schemes, controls the motor so that the actual speed is a better approximation of the desired speed.

Embodiments of the invention may include one or more of the following features. The controller controls the motor in response to the difference between the desired speed and the actual speed so as to minimize the difference. The controller controls the speed and acceleration of the motorcycle so as to increase traveling distance per charging cycle.

The motorcycle has an actuator (e.g., a lever) for generating a target speed signal representing a target speed of the motorcycle. The command module receives the target speed signal.

The system further includes an energy sensor that generates an energy signal representing an amount of energy stored in the battery and a desired distance setter which generates a desired traveling distance signal representing a desired traveling distance. The command module generates the desired speed signal based on the energy signal and the desired traveling distance signal. The command module also computes a maximum speed that can be maintained if the motorcycle is to travel the desired distance on the available amount of battery energy. The desired speed signal is based on the maximum speed when the target speed signal is above the maximum speed.

The command module includes a memory for storing a lookup table. The lookup table is used to determine the maximum speed that can be maintained if the motorcycle is to travel the desired distance on the available amount of battery energy. Alternatively, a computer program computes the maximum speed based on a formula. The maximum speed is based on properties of the motorcycle such as its motor properties. The command module determines the maximum speed based on experimental data on the motorcycle energy consumption at various speeds. Thus, the command module reduces the likelihood that the battery energy will run out before the motorcycle travels the desired distance.

In certain embodiments, the system further includes a range sensor that senses a range distance between the motorcycle and an object in its path, such as an automobile. A safe speed, representative of a maximum actual speed that the motorcycle can attain without danger of colliding with the object, is determined by the command module based on the range distance. The system further includes a display for displaying the safe speed to a motorcycle rider thereby providing a guideline for setting the target speed. The command module is configured such that the desired speed signal is based on the safe speed when the target speed is above the safe speed. The command module is configured such that when the target speed is greater than the safe speed, the desired speed is based on a product of the target speed and a scaling parameter. The scaling parameter is based on the safe speed. For example, the scaling parameter may be the ratio of the safe speed to a maximum attainable motorcycle speed. The command module includes a memory for storing a lookup table used to derive the safe speed. The command module includes a computer program for computing the safe speed based on a mathematical formula. The command module derives the safe speed based on experimental data on the braking distance of the motorcycle at various speed. The command module derives the safe speed based on properties of the motorcycle, such as its braking properties. Thus the system reduces the likelihood of collision with an obstacle, such as an automobile, that may be in the motorcycle's path.

Additionally, the system includes an element for setting a motorcycle rider's cruise speed. The command module is configured such when the cruise speed element is activated, the desired speed is based on the cruise speed.

The controller includes a current driver for driving the motor. The current driver increases the maneuverability of the motorcycle by providing direct control of the motor torque.

The command module generates the desired speed signal based on a digital signal from an analog to digital converter. The actual speed signal is an analog signal which is converted by an analog-to-digital converter. The controller controls the motor using a command signal which is converted by a digital-to-analog converter. The speed sensor may include a tachometer. At least part of the system may be implemented in software that runs on a processor. The controller and the command module may both be implemented by software that runs on the same processor or different processors.

In another general aspect of the invention, an apparatus for charging an electric motorcycle battery, used with an electric motorcycle having a wheel, includes a magnet and a conducting coil located within the magnetic field of the magnet. The conducting coil has a first end electrically connected to a first terminal of the battery and a second end electronically connected to a second terminal of the battery. At least one of the magnet and the conducting coil is mechanically coupled to the wheel so that rotation of the wheel results in relative motion between the coil and the magnet.

Embodiments of the invention may include one or more of the following. Either the coil or the magnet may be mechanically coupled to the wheel. The battery is an auxiliary battery for accessory lighting of the motorcycle (e.g., head, tail, and turn signal lights).

Other advantages and features of the invention will become apparent from the following description and the claims.

DETAILED DESCRIPTION

Figure 1:
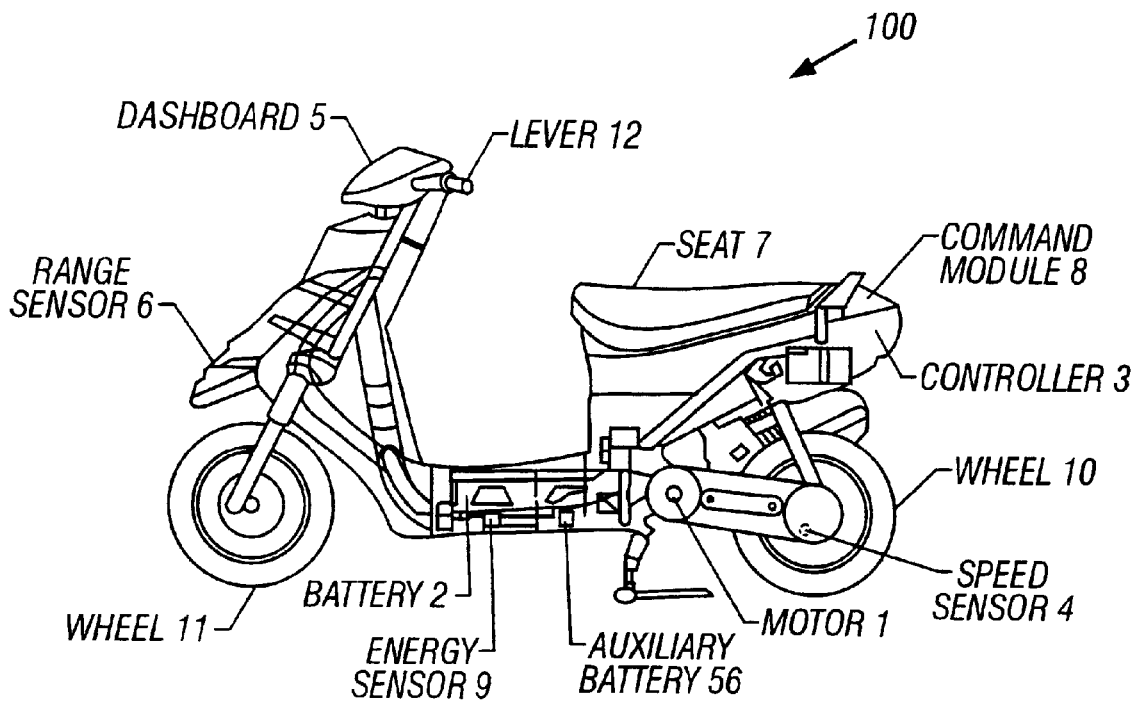
FIG. 1 is a side view of a motorcycle having a regulation system according to the invention.

Referring to FIG. 1, a motorcycle 100, includes a motor 1 which is powered by a battery 2. Motorcycle 100 includes a seat 7 upon which a rider (not shown) sits. The rider can establish a target traveling speed using either the lever 12 or a setter on the dashboard 5. The rider can also establish a desired traveling distance using a distance setter on the dashboard 5. Motorcycle 100 is also equipped with a speed sensor 4 for measuring the speed of a wheel 10, a range sensor 6 for measuring the distance between the motorcycle and an obstacle (e.g., a moving automobile) that might be located in its driving path, and an energy sensor 9 for measuring the amount of energy stored in the battery 2. A controller 3 and a command module 8, located underneath the seat 7, regulate the speed of the motorcycle 100.

Figure 2:
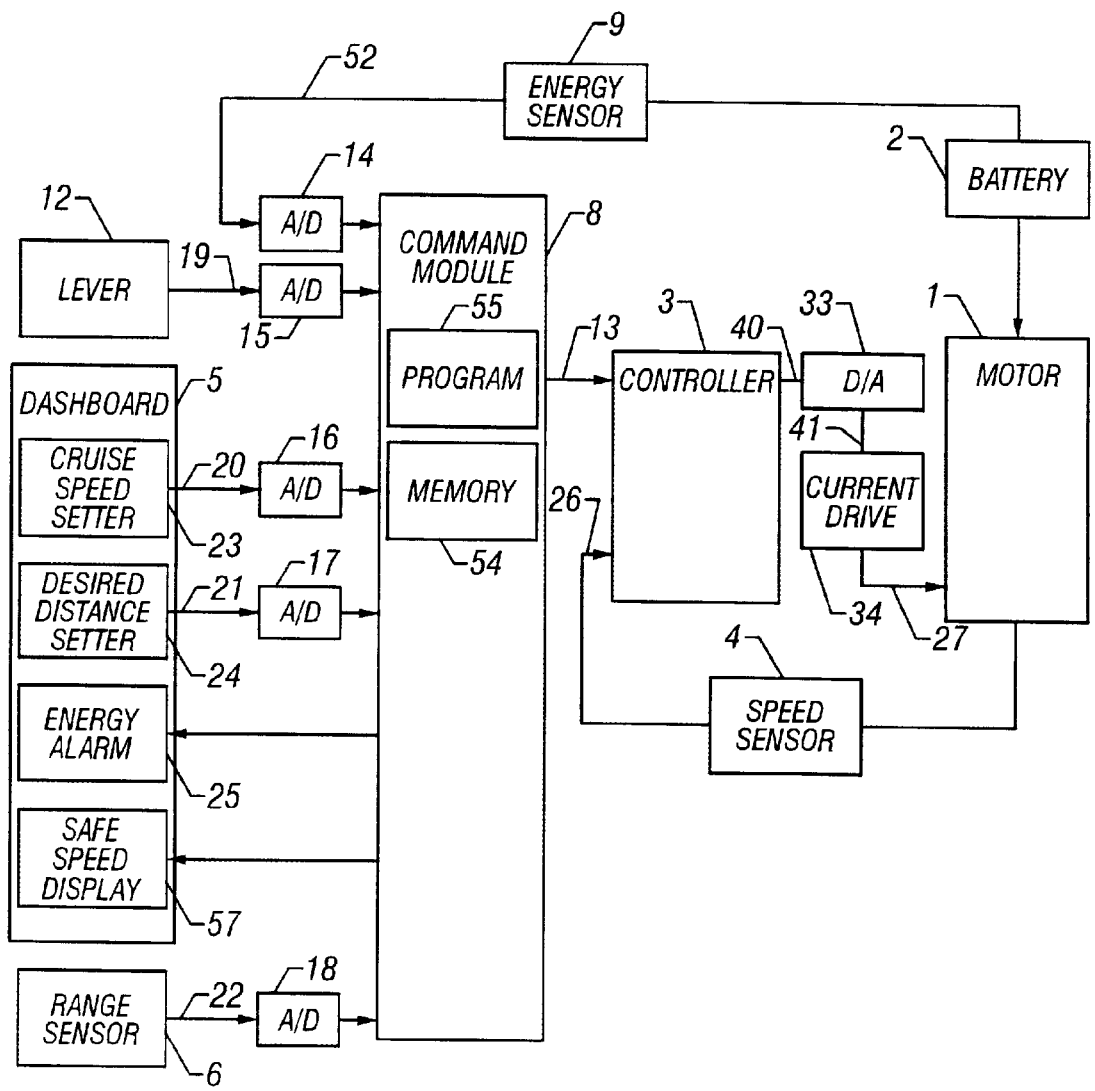
FIG. 2 is a block diagram of the components of the regulation system of the motorcycle of FIG. 1.

Referring to FIG. 2, the controller 3 operates in a closed loop mode to control the motor 1 in response to a desired speed signal 13 generated by the command module 8 and an actual speed signal 26 from the speed sensor 4. Specifically, the controller 3 uses the desired speed signal 13 and the actual speed signal 26 to generate a digital command signal 40 that is converted to an analog command signal 41 by digital to analog converter 33. A current drive 34 converts the analog command signal 41 to a current command signal 27 for driving the motor 1. The controller selects command signal 40 so that the actual speed 26 of the motor better approximates the desired speed 13.

The command module 8 establishes the desired speed 13 based on a series of analog input signals 19–22 that are converted to digital signals by analog-to-digital converters 14–18, respectively. Alternatively, digital sensors can be used to provide digital signals which do not require conversion by converters 14–18. The input signals include a range signal 22, which is generated by the range sensor 6 and represents the distance between the motorcycle 100 and, for example, an automobile that is ahead of its path. The command module 8 uses the range signal 22 to limit the generated desired speed signal 13 to avoid collision with the automobile.

The command module 8 also receives an energy signal 52, generated by energy sensor 9, representing the amount of remaining energy stored in the battery 2. The energy signal 52 is used in conjunction with the desired distance signal 21 to limit the desired speed signal 13 to avoid premature depletion of the stored energy before traveling the desired distance. The rider sets the desired distance signal 21 using the desired distance setter 24 on the dashboard 5. The command module 8 computes an approximate maximum distance that can be traveled with the available energy (represented by energy signal 52). In instances when the desired distance signal 21 represents a greater distance than the maximum distance, the command module 8 sounds an alarm 25 on the dashboard 5 to alert the rider.

Additionally, the rider uses lever 12 to set a target traveling speed, represented by target speed signal 19. Alternatively, the rider may set a target cruise speed signal 20 using cruise speed setter 23 on the dashboard 5, so that the rider need not maintain the lever 12 in a rotated position corresponding to the target speed. The command module 8 uses either the cruise speed signal 20 or the target speed signal 19 to determine the desired speed signal 13 depending on whether or not the rider has enabled the cruise speed setter 23 The command module 8 uses the range signal 22 from the range sensor 6 to determine the highest speed(safe speed) that can be attained by the motorcycle without danger of colliding with an obstacle in its path. The safe speed is displayed on display 57 of dashboard 5 The command module 8 also determines the maximum speed that can be attained (maximum speed) without danger of depleting the remaining stored energy (represented by energy signal 52) before traveling the desired distance (represented by signal 21). The command module 8 limits the desired speed signal 13 to ensure that it does not exceed either the safe speed or the maximum speed. If the desired speed signal 13 would otherwise exceed either speed limitation, the command module 8 sets the desired speed signal 13 to the exceeded limitation.

The internal structure of the controller 3 will now be described. The controller 3 implements a muscular-like control model that is described in Analysis and Implementation of NeuroMuscular-like Control for Robotic Compliance, IEEE Trans. Control Systems Technology, Vol. 5, No. 6, pp.586–597, Wu et. al. (Wu), incorporated herein by reference. The muscular-like control model is based on an experimental study of primate muscle and its voluntary and involuntary responses. The model includes a muscle-stiffness module that models muscle stiffness and a non-linear spindle-like module that emulates muscle reflex properties. The details of the controller and the methods used to set its parameters can be found in Wu. One method of tuning the controller for use in electric motorcycles is by setting the parameters so that they minimize the mean-square error between actual speed 26 from speed sensor 4 and desired speed signal 13 from command module 8

The controller 3 when tuned in the manner described in Wu efficiently controls the motor speed. The tuned controller can adapt to large deviations in the system response, thus ensuring that the closed-loop controller remains stable and efficient over a wide operating range of the electric motorcycle 100. It also increases the maneuverability and the acceleration of the motorcycle by directly and efficiently regulating the motor torque using the current drive. The non-linear damping of the controller reduces jerky motion, resulting in a smoother ride. Additionally, the controller 3 is well-suited for a man-machine interface because it is modeled after muscular response.

Figure 3A:
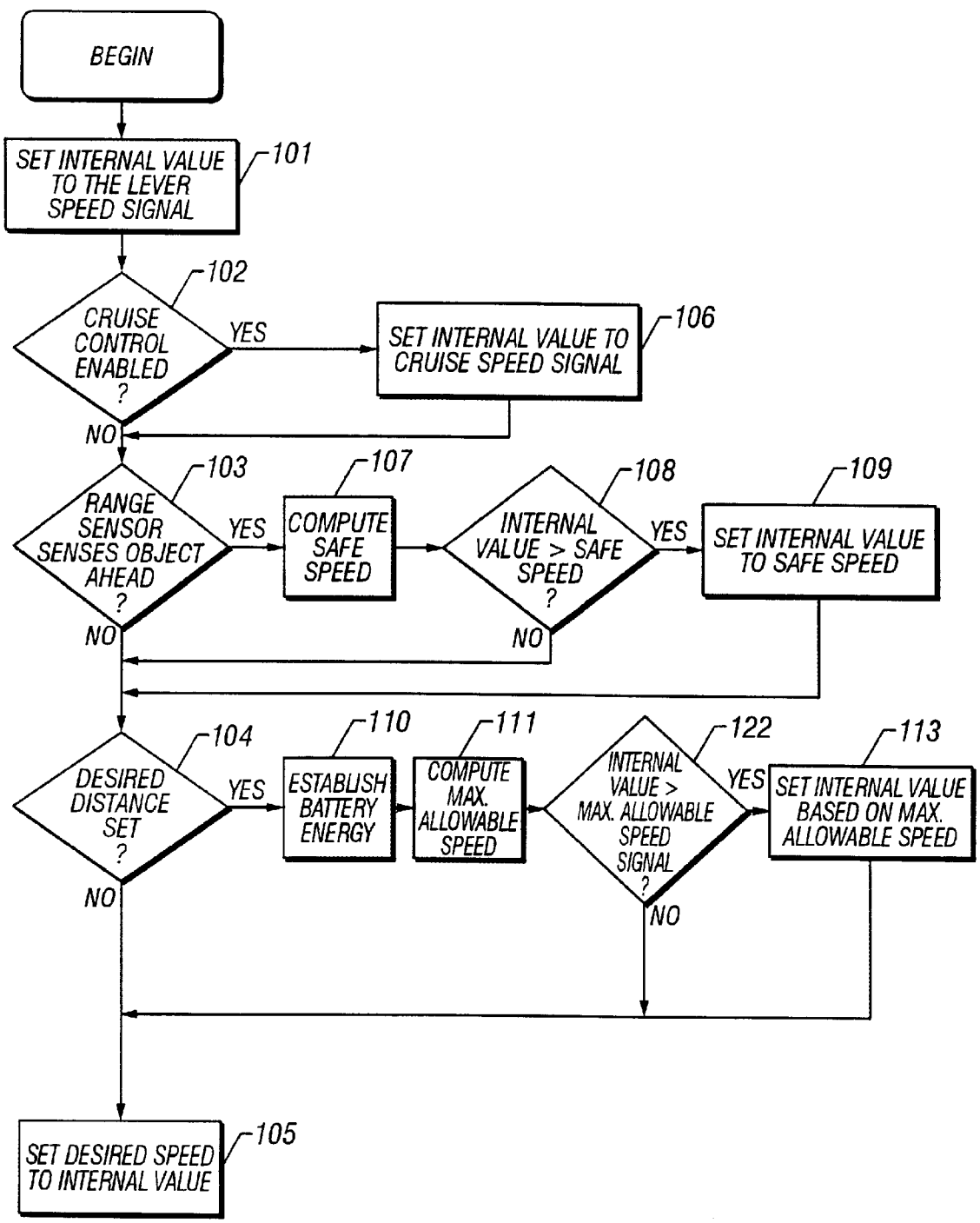
FIG. 3A is a flow diagram of a command module of the regulation system of FIG. 2.

Referring to FIG. 3A, operation of the command module 8 will be described. As discussed above, command module 8 is configured to determine the desired velocity based on various inputs 19–22. In determining the desired speed signal 13 the command module uses an internal value to hold intermediate determinations of the desired speed. The internal value may be a stored within a register in a memory 54 (FIG. 2) associated with a processor (not shown). The command module 8 starts by establishing the internal value to be the lever speed signal 19 set by the positioning of the lever 12 (step 101). The command module 8 then checks whether the cruise speed setter 23 is enabled (step 102). If setter 23 is enabled, the command module 8 sets the internal value to the cruise speed signal 20 (step 106). Otherwise, the command module 8 does not alter the internal value.

The command module 8 then checks whether the range sensor 6 senses an object in the path of the motorcycle (step 103). If it does the command module computes the highest speed that the motorcycle can have at the range distance 22 to the object and still decelerate to a stop before colliding with the object (safe speed)(step 107). The command module 8 then checks whether the internal value is greater than the safe speed (step 108). If the value is greater, the command module 8 sets the internal value to the safe speed (step 109).

The command module then checks whether the desired distance 21 is set (step 104). If it is, the command module establishes the battery energy based on the battery signal 52 from the energy sensor 9 (step 110). Command module 8 then computes the maximum speed that the motorcycle can maintain and still cover the desired distance with the available battery energy (maximum allowable speed) (step 111). If the internal value is greater than the computed maximum allowable speed (step 112), the command module sets (step 113) the internal value to the computed maximum allowable speed. The command module 8 then sets the desired speed signal 13 to the internal value and uses the desired speed signal 13 to command the motor 2 (step 105).

Figure 4:
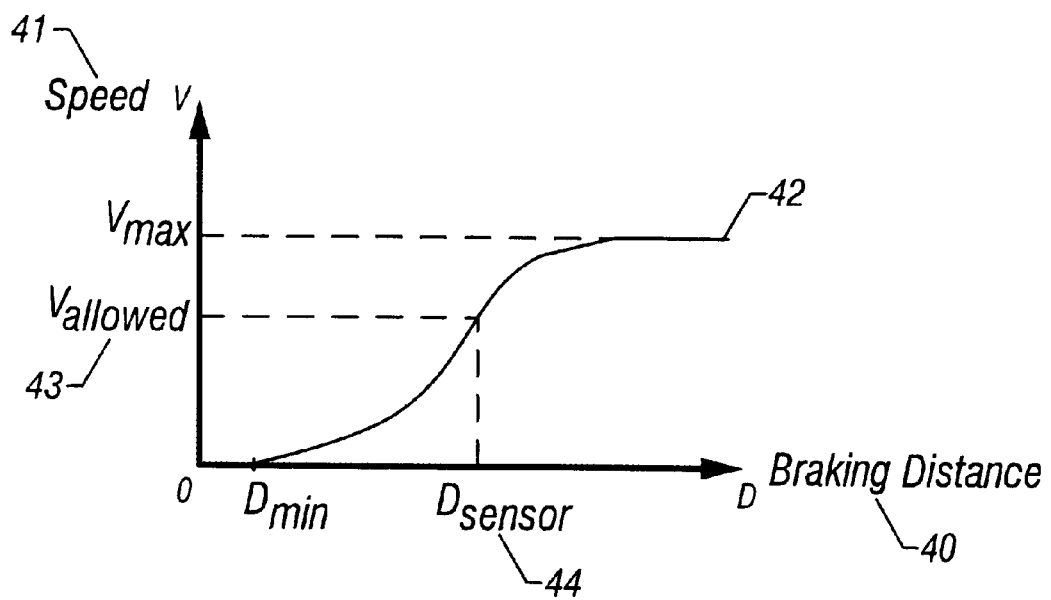
FIG. 4 is a graph showing the relationship between a safe motorcycle speed and a range distance from the motorcycle to an obstacle in its path.

Referring to FIG. 4, the command module limits the maximum allowable speed based on the range signal (measured by range sensor 6). Limiting the maximum allowable speed is based on a relationship between motorcycle traveling speed 41 as a function of the braking distance 40. As shown in FIG. 4, greater distances are required to brake from higher velocities. The command module limits the maximum allowable speed to ensure that the corresponding braking distance is less than the distance to an automobile in the path of the motorcycle, thus reducing the likelihood of collision. If the range signal (measured by range sensor 6) to an automobile in front of the motorcycle corresponds to a braking distance 44 to an object in the path of the motorcycle, the desired speed 13 is limited below the speed 43 associated with the braking distance 44 to ensure that the motorcycle can brake before colliding with the automobile. Thus, the safety of the rider is increased.

The relationship between braking distance and velocity (shown in FIG. 4) can be derived from the motorcycle properties such as motorcycle weight, motor capability, and traction properties. Alternatively, the relationship can be collected from experiments where braking distance is measured at various speeds. The relationship can be represented in a lookup table stored in memory 54 (FIG. 2). Alternatively, relationship can be computed by program 55 (FIG. 2) based on a mathematical formula that defines the relationship shown in FIG. 4.

Figure 5A:
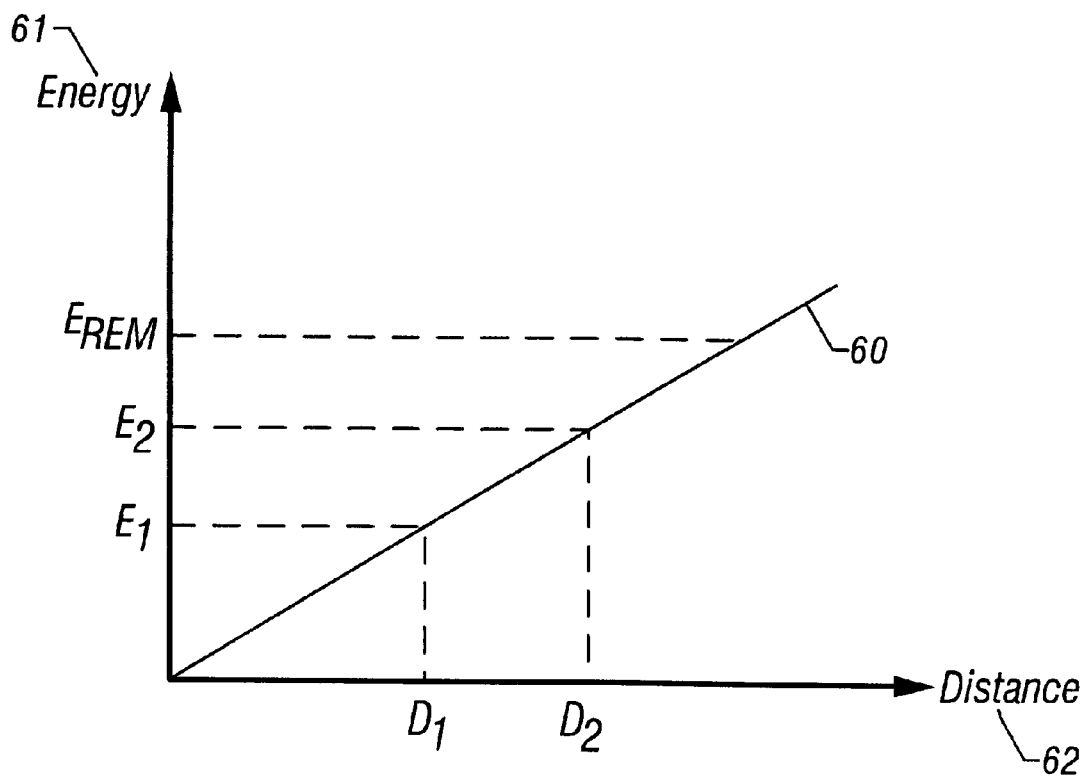
FIG. 5A is a graph showing the experimentally-derived relationship between the energy losses to friction and distance traveled by the motorcycle of FIG. 1.

FIG. 5A illustrates the relationship between the distance traveled 62 and the energy 61 lost over the distance due to friction. The relationship is derived by collecting energy and distance data. Although the concepts are applicable to any energy-distance relationship, we will use a linear energy-distance relationship, shown in FIG. 5A, in the subsequent discussion. The data is stored within memory 54 of the electric motorcycle for use by the command module 8 to manage the energy consumption of the electric motorcycle. As shown, the energy 61 consumed by the motorcycle increases with distance 62 traveled, for example, a distance d1 requires less energy E1 to travel than the energy E2 required to travel a longer distance d2.

In addition to energy losses to friction, energy is needed to accelerate the motorcycle to the desired velocity and decelerate it to a stop on reaching the destination. If the current-controlled motor 1 is uniformly accelerated and decelerated, this energy is given by:

$$\text{Energy} = 2 * \frac{J_m}{K_i} * V_d \tag{1}$$

where:
$J_m$ represents the inertial load on the motor,
$K_i$ represents the torque to current ratio of the motor,
$V_d$ represents the desired velocity, and
Energy is measured in Ampere seconds.

Figure 5B:
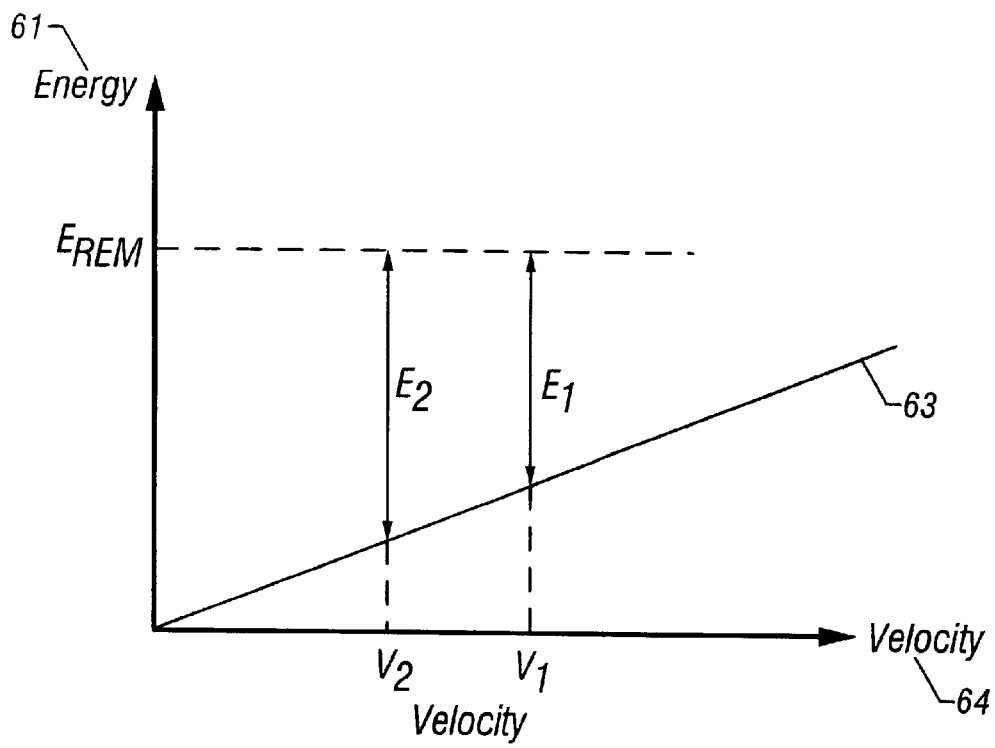
FIG. 5B is a graph showing the energy consumed by the motorcycle of FIG. 1 in accelerating to and decelerating from different velocities.

Referring to FIG. 5B, the proportional relationship 63 (of equation 1) between the energy 61 and the velocity 64 is shown graphically. Higher velocity requires greater energy. Given a remaining energy $E_{rem}$, and a traveling distance d1 associated with energy loss E1 (shown in FIG. 5B), the available energy for accelerating the motorcycle is given by the difference between $E_{rem}$ and E1. As shown in FIG. 5B, this energy can only drive the motorcycle at a maximum velocity v1 corresponding to the available energy. By ensuring that the motorcycle velocity does not exceed the maximum velocity v1, the command module can ensure that the motorcycle does not run out of energy before traveling the desired distance.

Similarly, given a remaining energy $E_{rem}$, and an alternative traveling distance d2 associated with energy loss E2 (shown in FIG. 5B), the available energy for accelerating the motorcycle is given by the difference between $E_{rem}$ and E2. As shown in FIG. 5B, this energy can only drive the motorcycle at a velocity v2 corresponding to the available energy. To ensure that the energy is not depleted before traveling the desired distance, the control module 8 limits the motorcycle speed so that it remains below the velocity v2. As expected, the greater traveling distance d2 has a lower maximum velocity v2 than the velocity v1 of the shorter traveling distance d1.

Figure 5C:
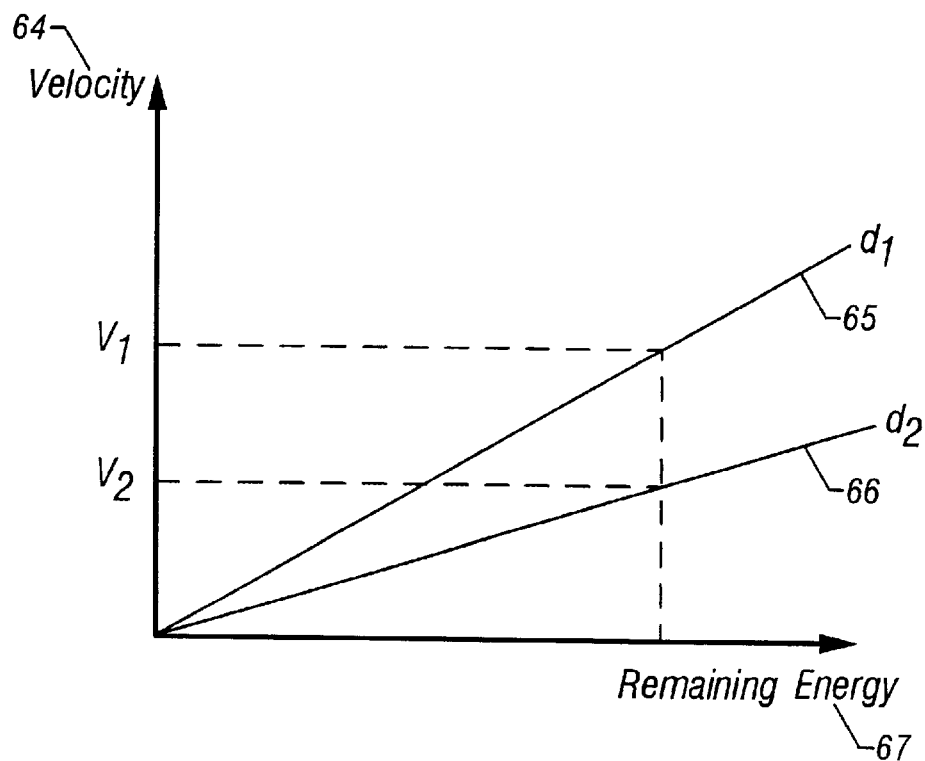
FIG. 5C is a graph showing the relationship between the maximum velocity, and the remaining energy for different desired traveling distances.

Referring to FIG. 5C, the relationship between the desired traveling distance, the available energy and the maximum velocity of FIGS. 5A and 5B can be combined into a series of graphs 65, 66 relating the velocity 64 and the remaining energy 67 as shown in FIG. 5C. Graph 65 shows the energy-velocity relationship for the traveling distance d1, while graph 66 shows the energy-velocity relationship for the traveling distance d2. A representation of the graphs is stored in memory 54. The graphs may be represented as a lookup table, or as an equation fitted to capture the corresponding relationship. Graph values may be read from the lookup table or computed by programme 55 based on an equation stored im memory 54. The command module 8 limits the maximum allowable speed using the graph corresponding to the desired traveling distance. The command module 8 uses the remaining battery energy to determine a maximum traveling speed that ensures that the remaining energy is sufficient to travel the desired distance.

The relationship between the remaining energy, the traveling distance, and the traveling speed can also be derived from the motorcycle properties such as its mass traction and motor properties. Alternatively, the relationship can be established from data collected in experiments where energy dissipation at various speeds is measured.

Figure 6:
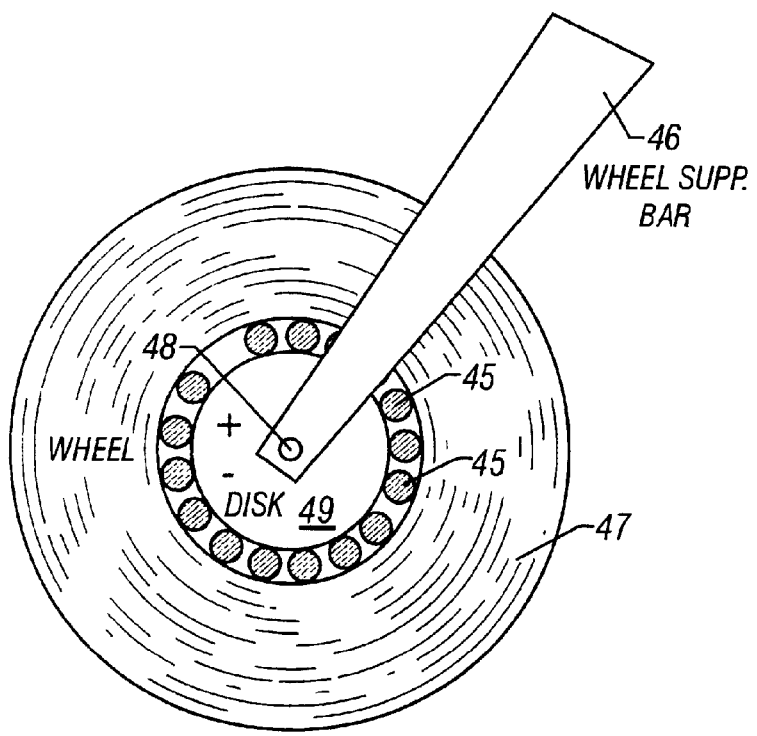
FIG. 6 is a side view of a wheel mounting that is configured to charge a battery system according to the invention.
Figure 7:
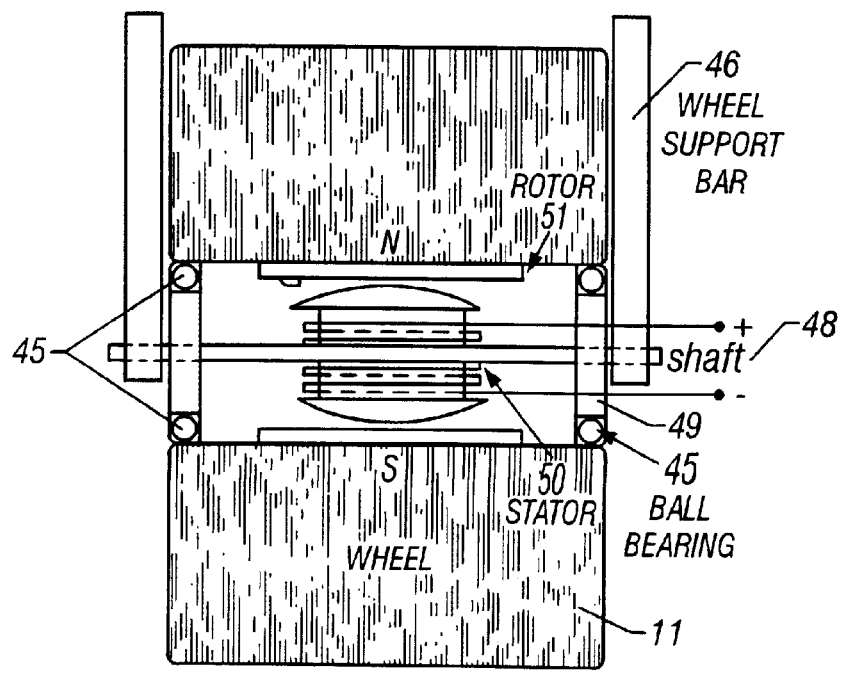
FIG. 7 is a cross-sectional view of the wheel mounting of FIG. 6 that is configured to charge a battery system according to the invention.

Referring to FIGS. 6–7, another aspect of the invention allows for the recharging of the battery 2 (FIG. 1) using mechanical energy from the front wheel 11 of the motorcycle. The wheel 11 is rotatably coupled to a non-rotatable shaft 48 by ball bearings 45 and a non-rotatable disk 49. A stator coil 50 of an electricity generator is attached to shaft 48 while the rotor magnet 51 is attached to the wheel 11. Motion of the wheel 11, such as rotation or vibration, results in relative motion between the rotor magnet 51 and the stator coil 50. This relative motion causes current to flow in the stator coil 50. By attaching a first terminal of the stator coil 50 to a first terminal of the battery 2 and a second terminal of the stator coil 50 to a second terminal of the battery 2, the current flow can be used to recharge the battery 2.

Alternatively, the electricity generator of FIG. 7 can be used to charge an auxiliary battery 56 that is used to provide power to motorcycle lights, such as turn signal lights, and head lamps. The auxiliary battery could also be used to provide power to the motor 1 in case battery 2 should run out of energy.

Figure 3B:
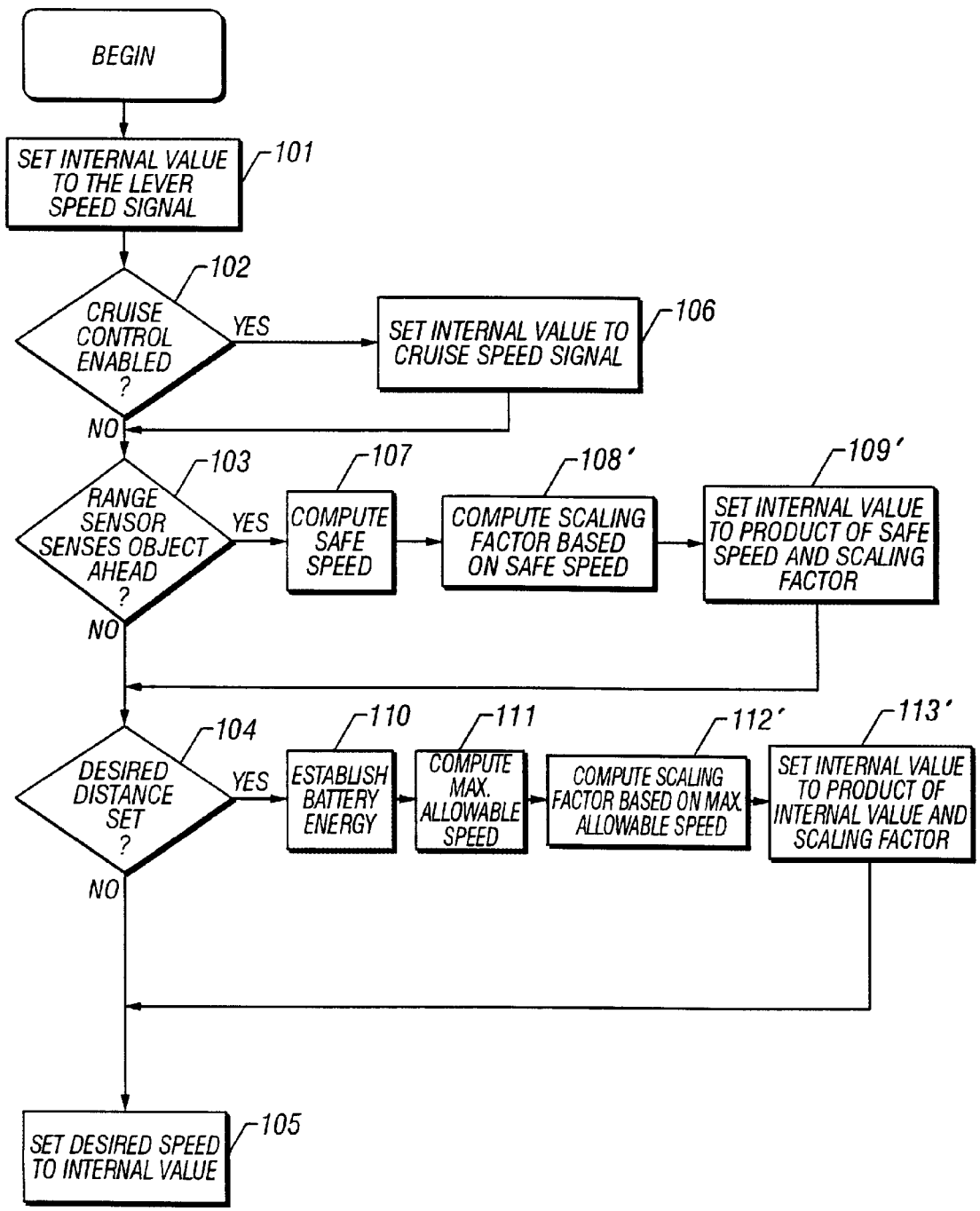
FIG. 3B is a flow diagram of an alternative implementation of a command module of the regulation system of FIG. 2.

Other embodiments are within the following claims. For example, the command module 8 may use other methods to limit the desired speed 13 based on the computed safe speed and maximum speed. FIG. 3B shows one such other method. Referring to FIG. 3B, instead of using the safe speed to limit the internal value (as shown in steps 108 and 109 of FIG. 3A), a scaling factor could be computed, based on the safe speed (step 108'), and used to scale down the internal value so that it is less than the safe speed (step 109'). For example, the internal value may be set to the product of the scaling factor and the internal value. One way of computing a suitable scaling factor is by dividing the safe speed by the highest speed attainable by the motorcycle. Similarly, instead of using the maximum allowable speed to limit the internal value (as shown in steps 112 and 113 of FIG. 3A), a second scaling factor could be computed, based on the maximum allowable speed (step 112'), and used to scale down the internal value (step 113'). For example, the internal value could be set to the product of the second scaling factor and the internal value. One way of computing a suitable scaling factor is by dividing the maximum allowable speed by the highest speed attainable by the motorcycle.

Alternatively, the controller may include other values, such as the motorcycle acceleration, and dynamic compensation to control the motor. The regulating system could be partially implemented in a computer programme that runs on a processor. Both the command module and the controller may be implemented in one or more programmes that run on the same computer processor. The programs may run on different processors.

What is claimed is:

1. A system for regulating the speed of a motorcycle of the type powered by an electric motor and a battery, comprising:
    a command module that generates a desired speed signal representative of a desired speed;
    a battery sensor that generates an energy signal representing an amount of energy stored in the battery;
    a distance setting element that generates a desired traveling distance signal representing a desired traveling distance of the motorcycle;
    said command module being configured such that said desired speed signal is based on said energy signal and said desired traveling distance signal.

2. A system for regulating the speed of a motorcycle of the type powered by an electric motor and a battery, comprising:
    a command module that generates a desired speed signal representative of a desired speed;
    a speed sensor that generates an actual speed signal representative of the actual speed of the motor;
    a controller that controls the electric motor in response to said desired speed signal and the actual speed signal; and
    wherein said command module is further configured to compute a maximum allowable speed that can be maintained if the motorcycle is to travel said desired distance on said amount of energy.

3. The system of claim 2, wherein said command module is configured such that said desired speed signal is based on said maximum allowable speed when said target speed is above said maximum allowable speed.

4. The system of claim 2, wherein said command module further includes a memory for storing a lookup table, said lookup table being used for determining said maximum allowable speed.

5. The system of claim 2, wherein said command module further includes a computer program for computing said maximum allowable speed based on a formula.

6. The system of claim 2, wherein said command module determines said maximum allowable speed based on experimental data on motorcycle energy consumption at various speeds.

7. The system of claim 2, wherein said command module computes said maximum allowable speed based on properties of the motorcycle.

8. A system for regulating the speed of a motorcycle of the type powered by an electric motor and a battery, comprising:
    a command module that generates a desired speed signal representative of a desired speed;
    a speed sensor that generates an actual speed signal representative of the actual speed of the motor;
    a controller that controls the electric motor in response to said desired speed signal and the actual speed signal;
    a range sensor that measures a range distance between said motorcycle and an object; and wherein the command module is further configured to determine a safe speed based on said range distance, said safe speed being a maximum actual speed that the motorcycle can attain without danger of colliding with said object.

9. The system of claim 8, further including a display for displaying said safe speed.

10. The system of claim 8, wherein said motorcycle is of the type having an actuator for setting a target speed of a motorcycle rider, said command module being configured such that the desired speed is based on said safe speed when said target speed is above said safe speed.

11. The system of claim 8, wherein said motorcycle is of the type having an actuator for setting a target speed of a motorcycle rider, said command module being configured such that the desired speed is based on a product of said target speed and a scaling parameter when said target speed is greater than said safe speed.

12. The system of claim 11, wherein said command module computes said scaling parameter based on said safe speed.

13. The system of claim 8, wherein said command module includes a memory for storing a lookup table, said lookup table being used by said command module to derive the safe speed.

14. The system of claim 8, wherein said command module includes a computer program for computing the safe speed based on a mathematical formula.

15. The system of claim 8, wherein the command module derives said safe speed based on experimental data on a braking distance of the motorcycle at different speeds.

16. The system of claim 8, wherein the command module determines said safe speed based on properties of the motorcycle.

17. The system of claim 8, further comprising an element for setting a motorcycle rider's cruise speed, said command module being configured such that said desired speed signal is based on said cruise speed signal when said cruise speed element is activated.

18. A method of determining the desired speed of a motorcycle of the type having an actuator for generating a target speed signal, said target speed signal representing a target speed of the motorcycle, said method comprising:
   establishing a safe speed in response to a range signal representing a range distance between the motorcycle and an obstacle in its path; and
   setting the speed to a value below the safe speed when the target speed exceeds the safe speed.

19. A method of determining the desired speed of a motorcycle of the type having an actuator for generating a target speed signal, said target speed signal representing a target speed of the motorcycle, said method comprising:
   establishing a safe speed in response to a range signal representing a range distance between the motorcycle and an obstacle in its path;
   setting the speed to a value below the safe speed when the target speed exceeds the safe speed; and
   wherein said value is determined by:
      selecting a scaling parameter;
      computing a product of said target speed and said scaling parameter; and
      setting the value to said product, said scaling parameter being selected so that said product does not exceed said safe speed.

20. The method of claim 19 wherein said scaling parameter is a ratio of said safe speed and a highest attainable speed of the motorcycle.

21. A method of determining the desired speed of a motorcycle of the type having an actuator for generating a target speed signal, said target speed signal representing a target speed of the motorcycle, said method comprising:
   establishing a safe speed in response to a range signal representing a range distance between the motorcycle and an obstacle in its path;
   setting the speed to a value below the safe speed when the target speed exceeds the safe speed; and
   wherein said safe speed is established using a lookup table that relates motorcycle braking distances to motorcycle speed.

22. A method of determining the desired speed of a motorcycle of the type having an actuator for generating a target speed signal, said target speed signal representing a target speed of the motorcycle, said method comprising:
   establishing a safe speed in response to a range signal representing a range distance between the motorcycle and an obstacle in its path;
   setting the speed to a value below the safe speed when the target speed exceeds the safe speed; and
   wherein said safe speed is established using a formula that relates motorcycle braking distances to motorcycle speed.

23. A method of determining the desired speed of a motorcycle of the type driven by a motor powered by a battery, said motorcycle having an actuator for generating a target speed signal, said target speed signal representing a target seed of the motorcycle, said method comprising:
   establishing a maximum allowable speed in response to an energy signal representing an available battery energy and a distance signal representing a desired traveling distance, said maximum allowable speed representing the maximum speed that the motorcycle can maintain without depleting said available energy before traveling said desired distance, and
   setting the speed to a value below the maximum allowable speed when the target speed exceeds the maximum allowable speed.

24. The method of claim 23 wherein said value is determined by:
   selecting a scaling parameter,
   computing a product of said target speed and said scaling parameter, and
   setting the value to said product, said scaling parameter being selected so that said product does not exceed said maximum allowable speed.

25. The method of claim 24 wherein said scaling parameter is a ratio of said maximum allowable speed and a highest attainable speed of the motorcycle.

26. The method of claim 23 wherein said maximum allowable speed is established using a lookup table that relates motorcycle energy consumption per unit of distance at various speeds.

27. The method of claim 23 wherein said maximum allowable speed is established using a formula that relates motorcycle energy consumption per unit of distance at various speeds.

28. A method for regulating the energy of a motorcycle of the type powered by an electric motor and a battery, comprising:
   receiving as inputs a first signal indicative of an amount of available energy stored in the battery and a second signal indicative of a desired traveling distance of the motorcycle;

producing a desired speed signal indicative of a desired speed based on the first and second signals;

using the desired speed signal to control the speed of the motor so as to ensure that the available energy is sufficient to travel the desired traveling distance.

29. The method of claim 28, further comprising:

receiving a signal indicative of a range distance between the motorcycle and an object; and determining from the signal a safe speed that can be attained by the motorcycle without colliding with the object.

30. The method of claim 29, further comprising:

adjusting the desired speed so that the desired speed does not exceed the safe speed.

31. A computer program tangibly stored on a computer-readable medium and operable to cause a computer to regulate the energy of a motorcycle of the type powered by an electric motor and a battery, the computer program comprising instructions to:

receive information indicative of an amount of available energy stored in the battery and an a desired traveling distance of the motorcycle;

produce a desired speed value from the information; and use the desired speed value to control the speed of the motor so as to ensure that the available energy is sufficient to travel the desired traveling distance.

* * * * *